(12) United States Patent
Tanahashi et al.

(10) Patent No.: US 7,366,576 B2
(45) Date of Patent: Apr. 29, 2008

(54) POSITION CONTROL DEVICE AND POSITION CONTROL METHOD FOR MACHINE TOOLS

(75) Inventors: Makoto Tanahashi, Aichi pref. (JP); Yasuhiko Suzuki, Aichi pref. (JP)

(73) Assignee: Yamazaki Mazak Corporation, Niwa Gun, Aichi Pref. (JP)

(*) Notice: Subject to any disclaimer, the term of this patent is extended or adjusted under 35 U.S.C. 154(b) by 646 days.

(21) Appl. No.: 10/910,084

(22) Filed: Aug. 3, 2004

(65) Prior Publication Data

US 2005/0033460 A1 Feb. 10, 2005

(30) Foreign Application Priority Data

Aug. 6, 2003 (JP) .............................. 2003-287893

(51) Int. Cl.
*G06F 19/00* (2006.01)
*G05B 19/18* (2006.01)

(52) U.S. Cl. .................. 700/61; 700/193; 700/188; 700/69; 700/70

(58) Field of Classification Search ................ 700/188, 700/193, 41, 43, 42, 61, 69, 70, 71
See application file for complete search history.

(56) References Cited

U.S. PATENT DOCUMENTS 5,304,905 A * 4/1994 Iwasaki ...................... 318/561
5,589,748 A * 12/1996 Kazama et al. ............. 318/560
6,147,468 A * 11/2000 Hamamura et al. ......... 318/625

FOREIGN PATENT DOCUMENTS

| JP | 5324086 A | 12/1993 |
|----|-----------|---------|
| JP | 7210221 | 8/1995 |
| JP | 2001222324 | 8/2001 |
| JP | 2003047269 | 2/2003 |
| JP | 2003311588 | 11/2003 |

* cited by examiner

*Primary Examiner*—Zoila Cabrera
*Assistant Examiner*—Nate Laughlin
(74) *Attorney, Agent, or Firm*—Colin P. Cahoon; Carstens & Cahoon, LLP

(57) ABSTRACT

A machine tool moves a driven member by use of a servomotor. A position control device controls the position of the driven member in accordance with full closed loop control. The position control device computes an integrated feedback value g in correspondence with a function F ($V_M$, $P_M$, $V_m$, $P_m$) in which four state amounts, motor speed $V_M$, motor position $P_M$, driven member speed $V_m$, and driven member position $P_m$ are independent variables. The thrust instruction $\tau^*$, which is inputted to the servomotor, is compensated with the integrated feedback value g. The servomotor is thus optimally driven and controlled in accordance with full closed loop control.

7 Claims, 6 Drawing Sheets

POSITION CONTROL DEVICE AND POSITION CONTROL METHOD FOR MACHINE TOOLS

BACKGROUND OF THE INVENTION

The present invention relates to improved position control devices and methods for machine tools, in which a servomotor is optimally driven and controlled in accordance with full closed loop control.

Conventionally, a position control device for a machine tool is known. The machine tool includes a servomotor serving as a driving member and, for example, a sliding shaft serving as a driven member, which is driven by the driving member. More specifically, driving of the sliding shaft is controlled in accordance with servo control, including full closed loop control and semi-closed loop control. In the control loop of the full closed loop control, feedback control is performed on data representing the position of the driven member of the machine tool, such as a table, detected by a position detecting device such as an optical scale.

In the control loop of the semi-closed loop control, feedback control is performed on the position data obtained by a position detecting device such as a rotary encoder incorporated in the servomotor. That is, the semi-closed loop control directly controls the servomotor, such that control is facilitated. However, the semi-looped control may eventually cause a steady-state deviation. In contrast, the full closed loop control directly detects and controls the position of the driven member. This eliminates the possibility of steady-state deviation, thus improving positioning accuracy advantageously.

However, since the full closed loop control directly involves the machine tool, it is necessary to set a position loop gain as a relatively low value, as compared to the semi-closed control, if the rigidity of the machine tool is relatively low. If this is the case, the response of the driven member to the controlling is hampered, leading to relatively inferior dynamic performance of the driven member including contouring accuracy.

SUMMARY OF THE INVENTION

Accordingly, it is an objective of the present invention to provide an improved position control device and an improved position control method for a machine tool that are capable of optimally driving and controlling a servomotor in accordance with full closed loop control.

To achieve the foregoing and other objectives and in accordance with the purpose of the present invention, the invention provides a device for controlling the position of a driven member of a machine tool in accordance with full closed loop control. The device includes a position control portion which generates a speed instruction in correspondence with a position instruction, a speed control portion which generates a thrust instruction in correspondence with the speed instruction in accordance with PI control, a driving member which drives the driven member in correspondence with the thrust instruction, a first detecting device which detects a driving state amount of the driving member, and a second detecting device which detects a driven state amount of the driven member. The device further includes a computing portion and a compensating portion. The computing portion computes an integrated feedback value in accordance with a function in which at least the speed of the driving member and the speed of the driven member are independent variables, or, alternatively, at least the position of the driving member and the position of the driven member are independent variables. The speed and position of the driving member are obtained based on the detected driving state amount, and the speed and position of the driven member are obtained based on the detected driven state amount. The compensating portion compensates the thrust instruction with the integrated feedback value.

The present invention also provides a method for controlling the position of a driven member of a machine tool in accordance with full closed loop control. The method includes: generating a speed instruction in correspondence with a position instruction; generating a thrust instruction in correspondence with the speed instruction in accordance with PI control; driving the driven member by using a driving member in correspondence with the thrust instruction; detecting a driving state amount of the driving member; detecting a driven state amount of the driven member; computing an integrated feedback value in accordance with a function in which at least the speed of the driving member and the speed of the driven member are independent variables, or, alternatively, at least the position of the driving member and the position of the driven member are independent variables, wherein the speed and position of the driving member are obtained based on the detected driving state amount and the speed and position of the driven member are obtained based on the detected driven state amount; and compensating the thrust instruction with the integrated feedback value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
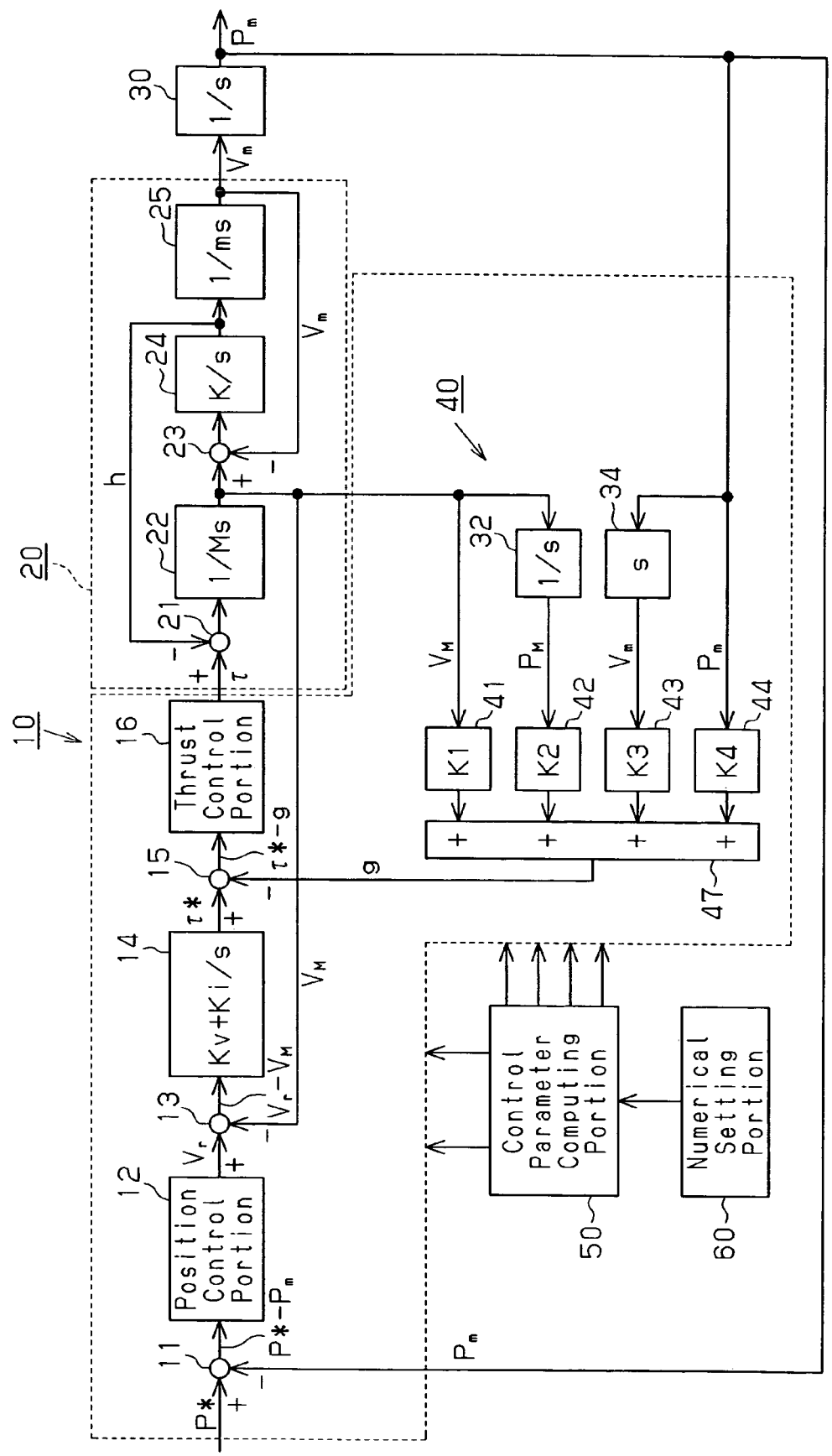
FIG. 1 is a block diagram showing a position control device for a machine tool according to a first embodiment of the present invention.
Figure 2:
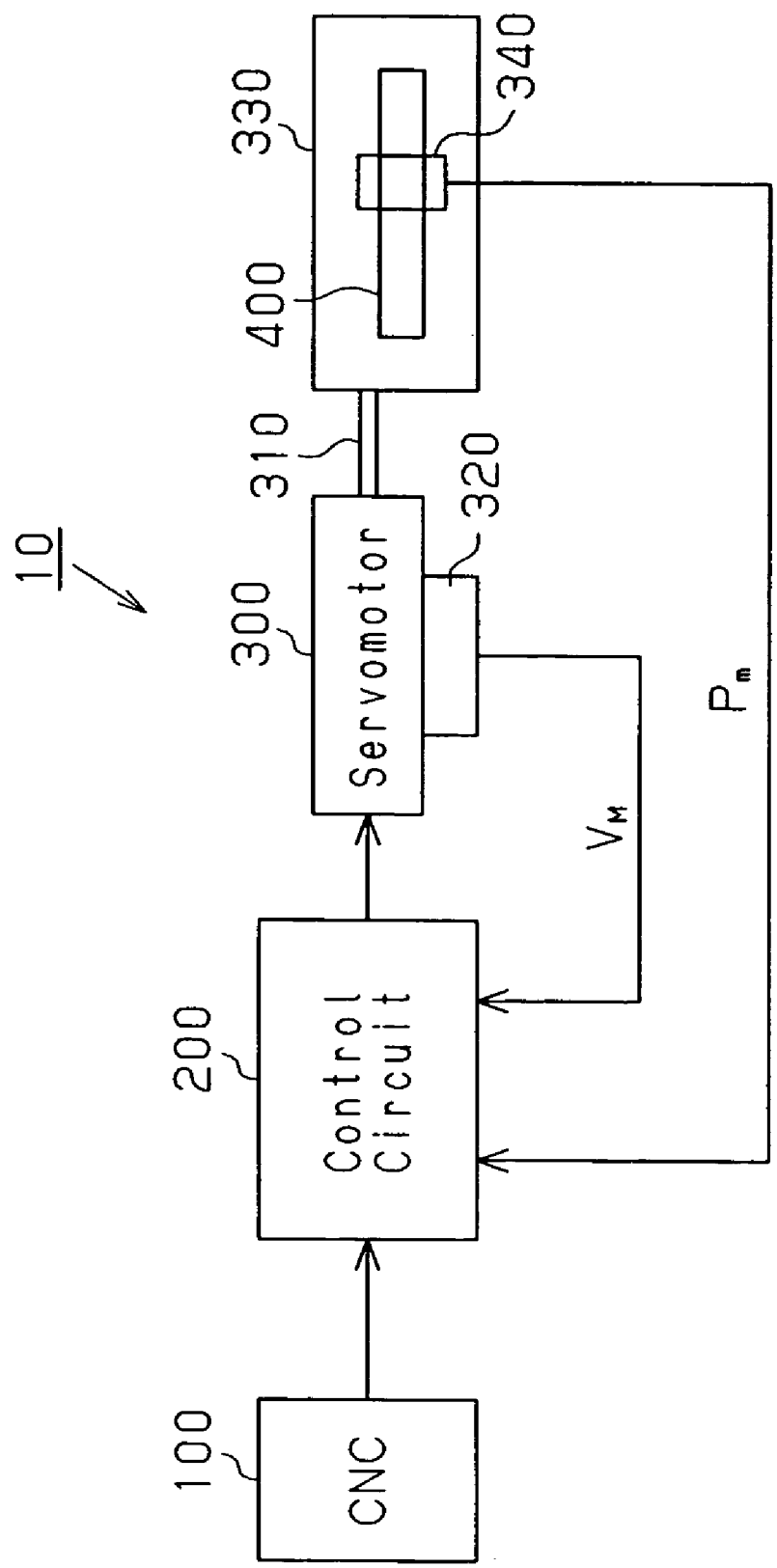
FIG. 2 is a schematic view showing the device of FIG. 1.

An embodiment of the present invention will hereafter be described with reference to FIGS. 1 and 2. FIG. 1 is a block diagram showing a position control device 1 for a machine tool. FIG. 2 is a schematic view showing the position control device 1.

With reference to FIG. 2, a numerical control device (hereinafter, referred to simply as "CNC") 100 includes a computer for controlling a machine tool. A control circuit 200 includes a central processing unit (CPU), a read only memory (ROM), and a random access memory (RAM). The control circuit 200 executes a procedure for controlling servo circuits, each of which drives a servomotor for a movable portion of the machine tool, in accordance with a software program. In this manner, the control circuit 200 controls each of the servomotors.

A servomotor 300 drives a driven member 400 of a machine tool driving system 330 through a connecting portion 310 such as a ball screw. The servomotor 300 includes a speed detecting device 320, which is a rotary encoder or tachogenerator connected to the servomotor 300. If the speed detecting device 320 is formed by the rotary encoder, a two-phase pulse signal having a phase difference of 90 degrees is generated. The rotary encoder may be an absolute encoder. Further, if the speed detecting device 320 is formed by the tachogenerator, an analog voltage is generated in correspondence with the speed of the servomotor 300. The tachogenerator then converts the analog voltage to a digital signal by means of an analog-digital converter and outputs the digital signal. The speed detecting device 320 detects motor speed $V_M$ of the servomotor 300 and outputs the detected value to the control circuit 200.

Also, a position detecting device 340 such as a linear scale is connected to the driven member 400 of the machine tool driving system 330 for detecting the position of the driven member 400. The position detecting device 340 outputs a driven member position $P_m$ to the control circuit 200 as a position detecting signal. Since the CNC of FIG. 2 is publicly known, the detailed description thereof will be omitted.

The control block of the position control device 10 will now be described with reference to FIG. 1.

Generally, in the position control device 10, a position control portion 12 outputs a speed instruction $V_r$ in accordance with a position instruction P*. Further, a speed control portion 14 of the position control device 10 outputs a thrust instruction $\tau^*$ in correspondence with the speed instruction $V_r$, in accordance with PI control (proportional integral control). The servomotor 300 is then controlled in correspondence with the thrust instruction $\tau^*$. Further, the position control device 10 controls the position of the driven member 400 such as a sliding shaft (not illustrated) in accordance with the full closed loop control, based on the detection of the position $P_m$ of the driven member 400.

In FIG. 1, the elements 11 to 15, 32, 34, 40 to 47, and 50 do not represent hardware elements but indicate functions performed by the CPU of the control circuit 200 in accordance with a software program.

The CNC 100, which serves as an instructing device, inputs the position instruction P* to a subtracter 11 of the position control device 10. The subtracter 11 subtracts the driven member position $P_m$ from the position instruction P*, obtaining a position deviation (P*-$P_m$). More specifically, the driven member position $P_m$ is obtained by detecting the position of the driven member 400, which is the object of control, directly with the position detecting device 340. The position detecting device 340 corresponds to a second detecting device. The driven member position $P_m$ corresponds to a driven state amount.

The position control portion 12 generates the speed instruction $V_r$ by proportionally amplifying the position deviation (P*-$P_m$) at the rate of a position loop gain. The speed instruction $V_r$ is inputted to a subtracter 13. The subtracter 13 subtracts the motor speed $V_M$ from the speed instruction $V_r$, obtaining a speed deviation ($V_r$-$V_M$). More specifically, the motor speed $V_M$ is determined by the speed detecting device 320, which serves as a first detecting device. The motor speed $V_M$ corresponds to a driving state amount of the servomotor 300, or the driving member. The servomotor 300 is connected to the machine tool driving system 330 through the connecting portion 310 such as a ball spring. The servomotor 300 thus moves the driven member 400 of the machine tool driving system 330.

The speed deviation ($V_r$-$V_M$) is inputted to the speed control portion 14. The speed control portion 14 generates a thrust instruction $\tau^*$ by amplifying the speed deviation ($V_r$-$V_M$) in a proportional integral manner, or controlling the speed deviation ($V_r$-$V_M$) in accordance with the PI control. In FIG. 1, the equation described in the frame corresponding to the speed control portion 14 represents the transfer function of the speed control portion 14. More specifically, $K_v$ indicates a speed loop proportional gain, and $K_i$ indicates a speed loop integral gain. Further, s indicates the Laplacean operator. A subtracter 15 subtracts an integrated feedback value g, or a compensating value that will be explained later, from the thrust instruction, determining a thrust instruction deviation ($\tau^*$-g).

A thrust control portion 16 includes a current controller, a power amplifier, and the servomotor 300. The thrust instruction deviation ($\tau^*$-g) is inputted to the thrust control portion 16. The current is controlled by the current controller and amplified by the power amplifier. The servomotor 300 outputs thrust $\tau$ (torque).

A mechanical model 20 of FIG. 1, which is controlled by the position control device 10, is a 2-inertia model of a linear motion system in which the driven member 400 (load) and the servomotor 300 are connected together by a component having a limited rigidity.

In FIG. 1, M represents a value obtained by converting moment of inertia of the servomotor 300 to inertial mass in terms of linear motion, which corresponds to primary-side inertia of the 2-inertia model. Further, m represents the inertial mass of the driven member 400 (load), which corresponds to secondary-side inertia of the 2-inertia model. K represents the rigidity of the 2-inertia model, and h represents a secondary-side thrust acting on the secondary-side inertia m. Index 1/s indicates an integrator.

As indicated in FIG. 1, an element 21 subtracts the secondary-side thrust h, or reactive force, from the thrust $\tau$. An element 22 obtains the motor speed $V_M$ in accordance with the transfer function (1/Ms). The motor speed $V_M$ is obtained by converting the rotation speed of the servomotor 300 to a value in terms of linear motion. An element 23 subtracts the speed $V_m$ of a driven member from the motor speed $V_M$ and outputs the resulting value to an element 24. The element 24 obtains the secondary-side thrust h in accordance with the transfer function (K/s). The obtained value is inputted to an element 25. By the element 25, the driven member speed $V_m$ is determined using the transfer function (1/ms). Further, the element 30, or an integrator 30, calculates the position $P_m$ of the driven member.

Next, an integrated feedback value computing portion 40 will be explained.

The integrated feedback value computing portion 40 includes an integrator 32, a differentiator 34, and a plurality of elements 41 to 44 and 47. The element 41 multiplies the motor speed $V_M$ by a motor speed feedback coefficient $K_1$ ($\neq 0$) and inputs the resulting value to the element 47. The integrator 32 integrates the motor speed $V_M$ for determining the motor position $P_M$ and inputs the determined value to the element 42. The element 42 multiplies the motor position $P_M$ by the motor position feedback coefficient $K_2$ ($\neq 0$) and inputs the obtained value to the element 47.

The differentiator 34 differentiates the driven member position $P_m$ for determining the driven member speed $V_m$ and inputs the resulting value to the element 43. The element 43 multiplies the driven member speed $V_m$ by the driven member speed feedback coefficient $K_3$ ($\neq 0$) and inputs the value obtained to the element 47. The element 44 multiplies the driven member position $P_m$ by the driven member position feedback coefficient $K_4$ ($\neq 0$) and inputs the value obtained to the element 47. The element 47 adds the values obtained from the elements 41 to 44 together for determining the integrated feedback value g, or the compensating value, and inputs the value g to the subtracter 15.

As described above, the control circuit 200 has a function for computing the integrated feedback value g and a function for compensating the thrust instruction $\tau^*$ with the integrated feedback value g.

The method for determining the various feedback coefficients $K_1$ to $K_4$, a speed loop proportional gain $K_v$, and a speed loop integral gain $K_i$, which are control parameters, is described below.

As indicated in the block diagram of FIG. 1, the transfer function ($V_m/V_r$) between the speed instruction $V_r$, or the output of the position control portion 12, and the speed $V_m$ of the driven member, or the output (a speed output) of the element 25 of the mechanical model 20, is indicated by the following equation (1-0). In order to eliminate the steady-state deviation in this equation, it is necessary to satisfy the following condition: $K_2+K_4=0$. Therefore, the transfer function ($V_m/V_r$) is represented by the following equation (1-1).

If the extreme values are defined as $-A\pm jA$, $-B$, and $-C$ and the zero point is defined as $-D$ (A, B, C, D are greater than zero), the transfer function ($V_m/V_r$) is indicated also by the following equation (1-2). In each of the equations, "s" represents the Laplacean operator.

$$\frac{V_m}{V_r} = \frac{K(K_v s + K_i)}{Mms^4 + m(K_v + K_1)s^3 + (K(M+m) + m(K_i + K_2))s^2 + K(K_v + K_1 + K_3)s + K(K_i + K_2 + K_4)} \quad (1-0)$$

$$\frac{V_m}{V_r} = \frac{K(K_v s + K_i)}{Mms^4 + m(K_v + K_1)s^3 + (K(M+m) + m(K_i + K_2))s^2 + K(K_v + K_1 + K_3)s + KK_i} \quad (1-1)$$

$$\frac{V_m}{V_r} = \frac{s+D}{s^4 + (2A+B+C)s^3 + (2A(B+C) + BC + 2A^2)s^2 + (2ABC + 2A^2(B+C))s + 2A^2BC} \quad (1-2)$$

By comparing the coefficients of the equations (1-1), (1-2), the following equations (2-1) to (2-6) are obtained for calculating various control parameters. Regarding the equations, the primary-side inertia M and the secondary-side inertia m each indicate inertial mass if the 2-inertia model is a linear motion system. In contrast, if the 2-inertia model is a rotation system, M and m each indicate moment of inertia. In the first embodiment, since the 2-inertia model is a linear motion system, the primary-side inertia M and the secondary-side inertia m each indicate inertial mass.

$$K_i = \frac{2A^2 BCMm}{K} \quad (2-1)$$

$$K_v = \frac{K_i}{D} \quad (2-2)$$

$$K_1 = (2A+B+C)M - K_V \quad (2-3)$$

$$K_2 = (2A(B+C) + BC + 2A^2)M - \frac{K(M+m)}{m} - K_i \quad (2-4)$$

$$K_3 = \frac{(2ABC + 2A^2(B+C))Mm}{K} - K_v - K_i \quad (2-5)$$

$$K_4 = -K_2 \quad (2-6)$$

In the first embodiment, A, B, C, D, M, m, and K are inputted to a numerical setting portion 60 of FIG. 1. Based on the inputs, a control parameter calculating portion 50, or a CPU, determines control parameters, $K_i$, $K_v$, and $K_1$ to $K_4$ in accordance with the equations (2-1) to (2-6). The obtained control parameters are stored in a non-illustrated memory. Further, when executing a position control program, which will be described later, the CPU reads the stored parameters and uses the parameters for performing various control procedures.

(Operation of First Embodiment)

Figure 3:
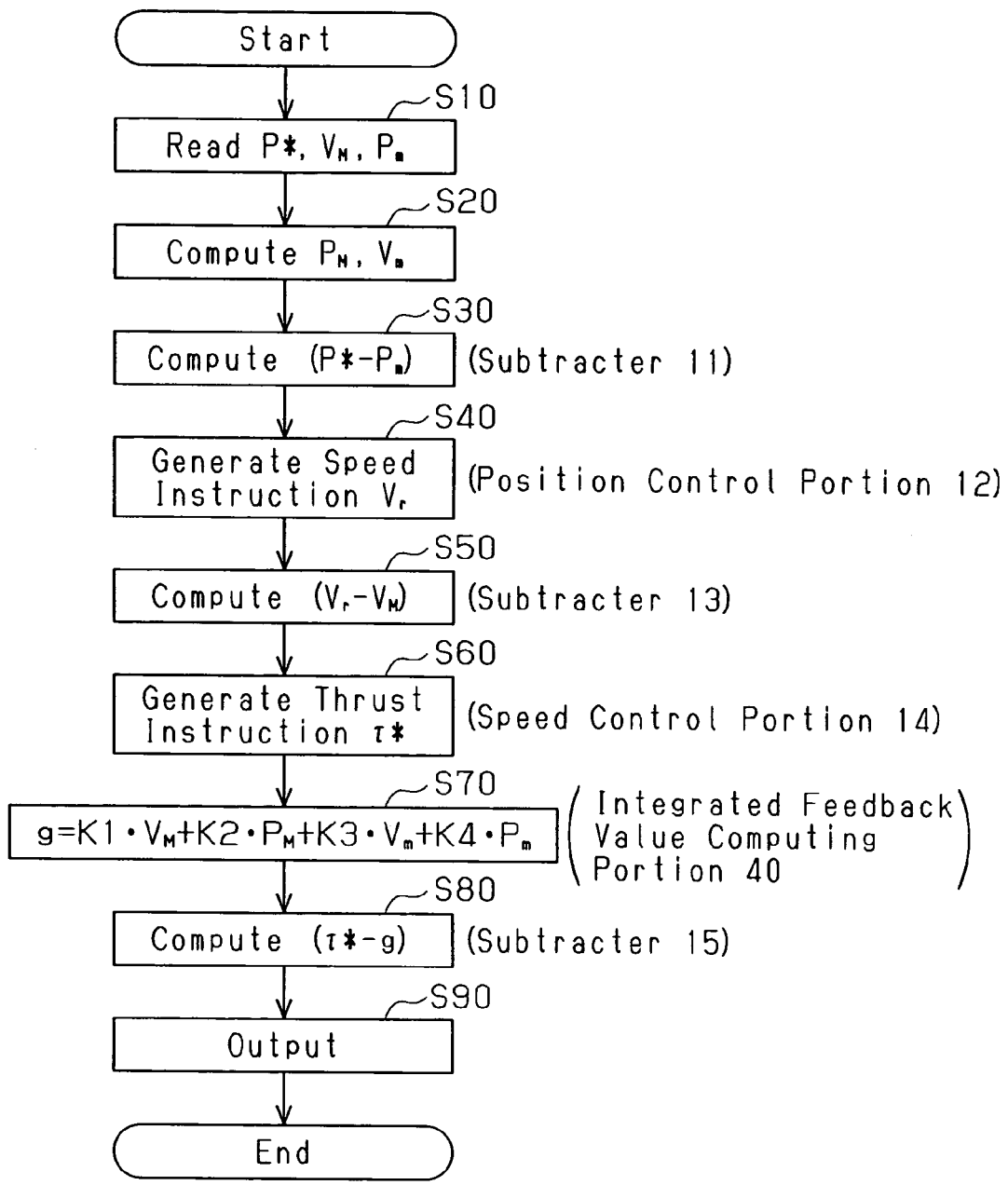
FIG. 3 is a flowchart indicating a position control program executed by a control circuit of the device of FIG. 1.

Next, the operation of the position control device 10 will be explained with reference to FIG. 3, which is a flowchart indicating the position control program executed by the CPU of the control circuit 200. The program is performed periodically.

More specifically, the CPU reads the position instruction P*, the motor speed $V_M$, and the driven member position $P_m$, in step S10. Further, in step S20, the integrator 32 obtains the motor position $P_M$ in correspondence with the motor speed $V_M$ while the differentiator 34 determines the driven member speed $V_m$ in accordance with the driven member position $P_m$.

In step S30, the position deviation ($P^*-P_m$) is calculated by the subtracter 11. Subsequently, in step S40, the position control portion 12 proportionally amplifies the position deviation ($P^*-P_m$) at the rate of the position loop gain in step S40, such that the speed instruction $V_r$ is generated.

In step S50, the subtracter 13 computes the speed deviation ($V_r-V_M$). In the subsequent step S60, the speed control portion 14 amplifies the speed deviation ($V_r-V_M$) in a proportional integral manner, such that the thrust instruction $\tau^*$ is generated.

In step S70, the motor speed $V_M$, the motor position $P_M$, the driven member speed $V_m$, and the driven member position $P_m$ are multiplied respectively by the motor speed feedback coefficient $K_1$, the motor position feedback coefficient $K_2$, the driven member speed feedback coefficient $K_3$, and the driven member position feedback coefficient $K_4$. The obtained values are added together for determining the integrated feedback value g, which is a compensating value.

That is, the CPU executes the calculation indicated by the following equation (4).

$$g = K_1 \cdot V_M + K_2 \cdot P_M + K_3 \cdot V_m K_4 \cdot P_m \quad (4)$$

In other words, the equation (4) indicates the function F ($V_M$, $P_M$, $V_m$, $P_m$) in which the motor speed $V_M$, motor position $P_M$, driven member speed $V_m$, and driven member position $P_m$ are independent variables, used for determining the integrated feedback value g. Further, the step S70 corresponds to the integrated feedback value computing means.

In step S80, the subtracter 15 subtracts the integrated feedback value g from the thrust instruction $\tau^*$ for determining the thrust instruction deviation ($\tau^*-g$). In step S90, a current instruction corresponding to the determined thrust instruction deviation (τ*−g) is outputted to the thrust control portion 16.

The first embodiment has the following operational effects.

(1) In the first embodiment, the position control device 10 for a machine tool includes the speed detecting device 320 and the position detecting device 340. The speed detecting device 320 detects the motor speed $V_M$, or the driving state amount, of the servomotor 300. The position detecting device 340 detects the driven member position $P_m$, or the driven state amount, of the driven member 400 such as a sliding shaft. Further, the control circuit 200 computes the integrated feedback value g based on the function F ($V_M$, $P_M$, $V_m$, $P_m$) involving four independent variables. The independent variables correspond to four state amounts, which are the motor speed $V_M$, motor position $P_M$, driven member speed $V_m$, and driven member position $P_m$. The motor speed $V_M$ and the motor position $P_M$ are obtained in accordance with the detecting signal of the speed detecting device 320. The driven member speed $V_m$ and the driven member position $P_m$ are obtained in accordance with the detecting signal of the position detecting device 340. The control circuit 200 compensates the thrust instruction τ* with the integrated feedback value g.

In other words, in accordance with the method for controlling the position of the machine tool of the first embodiment, the integrated feedback value g is determined in correspondence with the function F ($V_M$, $P_M$, $V_m$, $P_m$) in which the four state amounts, the motor speed $V_M$, motor position $P_M$, driven member speed $V_m$, and driven member position $P_m$ are independent variables. The obtained value g is used for compensating the thrust instruction τ*.

In this manner, full closed loop control is performed based on detection of the position $P_m$ of the driven member 400. Further, the thrust instruction τ* is compensated with the integrated feedback value g reflecting the speed $V_m$ of the driven member (motion data). It is thus possible to suppress vibration of the machine tool. Therefore, unlike the prior art, the speed loop gain $K_v$, the speed loop integral gain $K_i$, and the position loop gain can be set at relatively large values. As a result, even if the rigidity of the machine tool is relatively low, it is unnecessary to set the position loop gain at a relatively low value. The dynamic performance such as contouring accuracy is thus prevented from being hampered.

(2) In the position control device 10 and the position control method of the first embodiment, the function F ($V_M$, $P_M$, $V_m$, $P_m$), which is computed by the control circuit 200, is obtained by multiplying the four parameters, the motor speed $V_M$, motor position $P_M$, driven member speed $V_m$, and driven member position $P_m$ by the predetermined feedback coefficients $K_1$, $K_2$, $K_3$, and $K_4$, respectively, and adding the obtained values together. More specifically, the function F is determined by the equation (4). It is thus possible to obtain the aforementioned operative effect (1) easily.

(3) In the first embodiment, the motor position feedback coefficient $K_2$, by which the motor position $P_M$ is multiplied, and the driven member position feedback coefficient $K_4$, by which the driven member position $P_m$ is multiplied, have equal absolute values but different signs. This eliminates the possibility of steady-state deviation.

(4) In the first embodiment, the control parameter computing portion 50 computes the gain used in the PI control of the speed control portion 14 as well as the four feedback coefficients, in accordance with the equations (2-1) to (2-5), which are obtained by comparing the coefficients between the equations representing the transfer functions (1-1), (1-2). Based on A, B, C, D, M, m, and K inputted from the numerical setting portion 60, the control parameter computing portion 50, or the CPU, determines the control parameters $K_i$, $K_v$, and $K_1$ to $K_4$ using the equations (2-1) to (2-6).

(5) In the first embodiment, the thrust instruction τ*, which is generated by the speed control portion 14 in accordance with the PI control, is compensated with the integrated feedback value g. Therefore, the PI control can be performed in the same manner as conventional PI control, without requiring a particular procedure.

As long as the device of FIG. 1 is made effective by identifying the mechanical model 20 and computing the feedback coefficients using Modern Control Theory, the position control device 10 is installed reliably. In addition, since the position control device 10 is operated in accordance with the PI control, stable operation of the position control device 10 is ensured regardless of a minor modification of mechanical data such as work weight.

Figure 4:
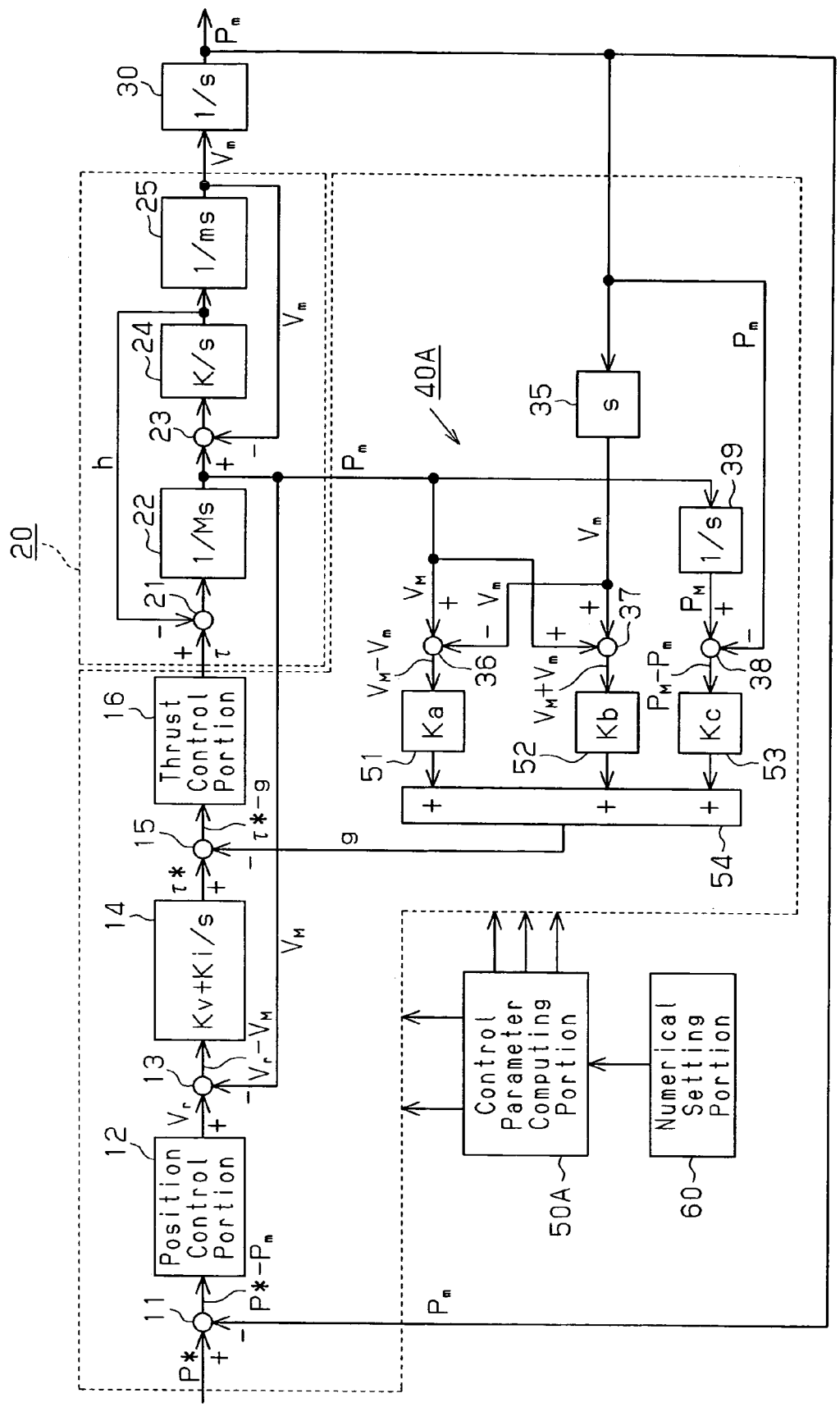
FIG. 4 is a block diagram showing a position control device for a machine tool according to a second embodiment of the present invention.

Next, a second embodiment of the present invention will be described with reference to FIGS. 4 to 6. In the following, the same or like reference numerals are given to parts of the second embodiment that are the same or like corresponding parts of the first embodiment. The description thus focuses on the differences between the first embodiment and the second embodiment.

In the second embodiment, an integrated feedback value computing portion 40A replaces the integrated feedback value computing portion 40 of the first embodiment. Further, a control parameter computing portion 50A replaces the control parameter computing portion 50.

The integrated feedback value computing portion 40A, which serves as the aforementioned integrated feedback value computing means, will hereafter be explained. The integrated feedback value computing portion 40A includes a differentiator 35, elements 36 to 38, an integrator 39, and elements 51 to 54.

The differentiator 35 differentiates the driven member position $P_m$ for determining the driven member speed $V_m$. The determined value is inputted to the elements 36, 37. The element 36, which is a subtracter, subtracts the driven member speed $V_m$ from the motor speed $V_M$ and outputs the obtained value, the speed difference ($V_M$−$V_m$), to the element 51. The element 37, which is an adder, adds the motor speed $V_M$ and the driven member speed $V_m$ and outputs the obtained value, the speed total ($V_M$+$V_m$), to the element 52. The integrator 39 integrates the motor speed $V_M$ and outputs the integrated value, the motor position $P_M$, to the element 38, which is also a subtracter. The element 38 subtracts the driven member position $P_m$ from the motor position $P_M$ and outputs the obtained value, the position deviation ($P_M$−$P_m$), to the element 53.

The element 51 multiplies the speed difference ($V_M$−$V_m$) by a speed difference coefficient $K_a$, which is a feedback coefficient, and outputs the resulting value to the element 54. The element 52 multiplies the speed total ($V_M$+$V_m$) by a speed total coefficient $K_b$, which is also a feedback coefficient, and outputs the resulting value to the element 54. The element 53 multiplies the position deviation ($P_M$−$P_m$) by a position deviation coefficient $K_c$, which is also a feedback coefficient, and outputs the resulting value to the element 54. The element 54 then adds the outputs of the elements 51 to 53 together, thus determining the integrated feedback value g, or the compensating value. The determined value is inputted to the subtracter 15.

In the second embodiment, the speed difference coefficient $K_a$, the speed total coefficient $K_b$, and the position deviation coefficient $K_c$ are calculated in accordance with the following equations (3-1) to (3-3). In these equations, $K_d$ is a parameter for increasing vibration damping between the servomotor 300 and the driven member 400, $K_{os}$ is a parameter for suppressing overshooting of movement of the servomotor 300 and the driven member 400, and $K_{va}$ is a parameter for reducing amplitude of the aforementioned vibration. Further, in this embodiment, the speed loop proportional gain $K_v$ and the speed loop integral gain $K_i$ are predetermined optimal values for position control, which are obtained by, for example, a test.

$$K_a = K_d \cdot K_v \tag{3-1}$$

$$K_b = K_o \cdot K_v \tag{3-2}$$

$$K_c = K_{va} \cdot K_i \tag{3-3}$$

Figure 5:
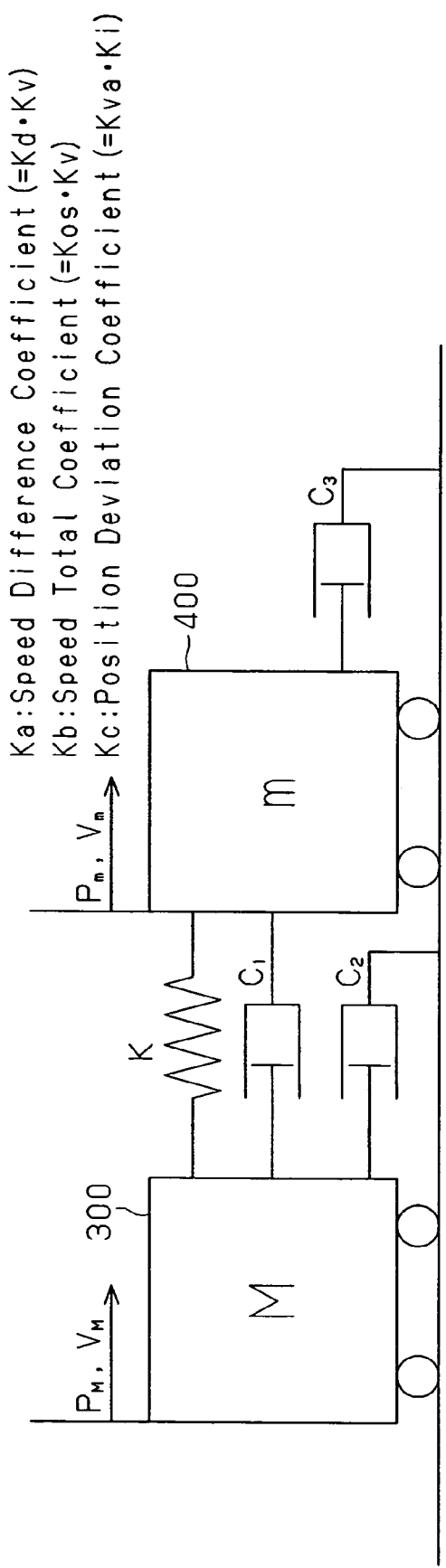
FIG. 5 is a schematic view showing a 2-inertia model.

With reference to FIG. 5, the speed difference coefficient $K_a$, the speed total coefficient $K_b$, and the position deviation coefficient $K_c$ will be explained as follows. FIG. 5 is a schematic view showing the 2-inertial model.

As described above, the speed difference coefficient $K_a$ is the value by which the speed difference $(V_M - V_m)$ is multiplied. Thus, if the coefficient $K_a$ is set as a relatively large value, a viscosity coefficient C1 of a portion between the servomotor 300 and the driven member 400 becomes relatively large, such that vibration damping between the servomotor 300 and the driven member 400 is enhanced.

The speed total coefficient $K_b$ is the value by which the speed total $(V_M + V_m)$ is multiplied. Thus, if the coefficient $K_b$ is set as a relatively large value, a viscosity coefficient C2 of a portion between the servomotor 300 and a corresponding reference and a viscosity coefficient C3 of a portion between the driven member 400 and a corresponding reference also become relatively large. As a result, if the coefficient $K_b$ is relatively large, movement of the servomotor 300 and the driven member 400 as a whole is suppressed, such that overshooting is reduced.

The position deviation coefficient $K_c$ is the value by which the position deviation $(P_M - P_m)$ is multiplied. Thus, if the coefficient $K_c$ is set as a relatively large value, the rigidity K of the portion between the servomotor 300 and the driven member 400 also becomes relatively large, such that the vibration amplitude between the servomotor 300 and the driven member 400 becomes relatively small.

Further, the speed difference coefficient $K_a$ and the speed total coefficient $K_b$ are approximate to the speed loop proportional gain $K_v$. Therefore, the coefficient $K_a$ is obtained by multiplying the speed loop proportional gain $K_v$ by $K_d$, which is a parameter representing the rate with respect to the gain $K_v$, as indicated by the equation (3-1). In the same manner, the coefficient $K_b$ is obtained by multiplying the speed loop proportional gain $K_v$ by $K_{os}$, which is a parameter representing the rate with respect to the gain $K_v$, as indicated by the equation (3-2). Therefore, in order to adjust the speed difference coefficient $K_a$ or the speed total coefficient $K_b$, the associated values $K_d$, $K_{os}$ may be adjusted. The values $K_d$, $K_{os}$ may be set as a value from 0 to 1. Associated operators may be determined by the numerical setting portion 60. When receiving the speed loop proportional gain $K_v$ and the parameters $K_d$, $K_{os}$ from the numerical setting portion 60, the control parameter computing portion 50A computes the speed difference coefficient $K_a$ and the speed total coefficient $K_b$ in accordance with the associated equations (3-1), (3-2). The obtained values are stored in a non-illustrated memory.

Likewise, the position deviation coefficient $K_c$ is approximately equal to the speed loop integral gain $K_i$. Therefore, the coefficient $K_c$ is obtained by multiplying the speed loop integral gain $K_i$ by $K_{va}$, which is a parameter representing the rate with respect to the gain $K_i$, as indicated by the equation (3-3). Therefore, in order to adjust the position deviation coefficient $K_c$, the value $K_{va}$ may be adjusted. The values $K_{va}$ may be set as a value from 0 to 1. An associated operator may be determined by the numerical setting portion 60. When receiving the speed loop integral gain $K_i$ and the parameter $K_{va}$ from the numerical setting portion 60, the control parameter computing portion 50A computes the position deviation coefficient $K_c$ in accordance with the equation (3-3). The obtained value is stored in a non-illustrated memory.

Figure 6:
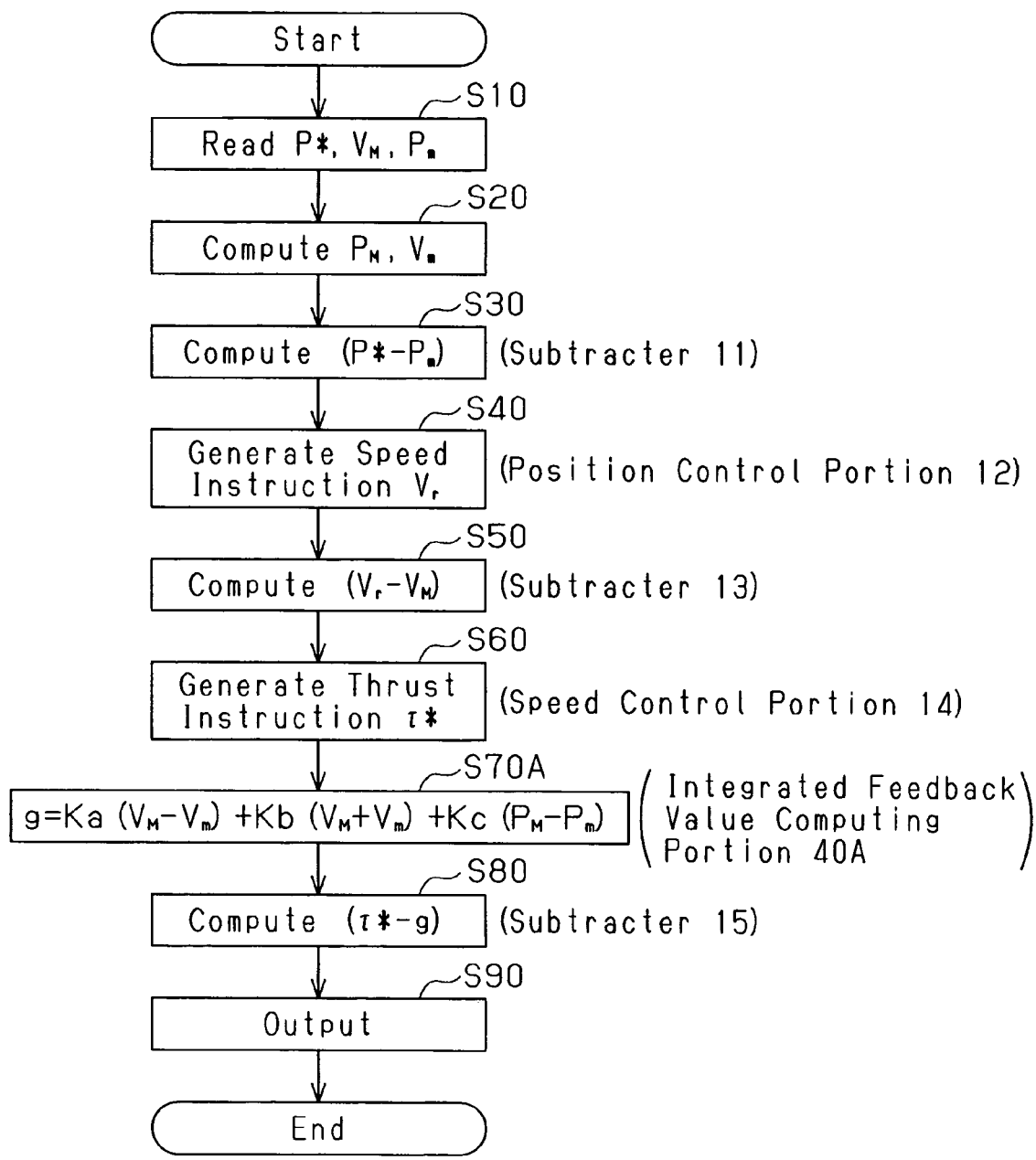
FIG. 6 is a flowchart indicating a position control program executed by a control circuit of the second embodiment.

FIG. 6 is a flowchart indicating a position control program of the second embodiment executed periodically by the CPU of the control circuit 200 of the position control device 10. The second embodiment is different from the first embodiment in that step S70A is performed instead of step S70. Since the remaining steps of the program are the same as those of the first embodiment, description thereof will be omitted.

In step S70A, the difference $(V_M - V_m)$ between the motor speed $V_M$ and the driven member speed $V_m$, the total $(V_M + V_m)$ of the motor speed $V_M$ and the driven member speed $V_m$, and the difference $(P_M - P_m)$ between the motor position $P_M$ and the driven member position $P_m$ are multiplied respectively by $K_a$, $K_b$, $K_c$. The obtained three values are then added together for determining the integrated feedback value g, or the compensating value.

More specifically, in step S70A, the CPU computes the integrated feedback value g in accordance with the following equation (5).

$$g = K_a(V_M - V_m) + K_b(V_M + V_m) + K_c(P_M - P_m) \tag{5}$$

In other words, the equation (5) indicates the function F $(V_M, P_M, V_m, P_m)$ in which the motor speed $V_M$, motor position $P_M$, driven member speed $V_m$, and driven member position $P_m$ are independent variables. Further, the step S70A corresponds to the integrated feedback value computing means.

As described above, the second embodiment has the following operational effects, in addition to the operational effects (1) and (5) of the first embodiment.

(1) In the second embodiment, the function F $(V_M, P_M, V_m, P_m)$ computed by the control circuit 200 is obtained by multiplying the difference between the motor speed $V_M$ and the driven member speed $V_m$, the total of the motor speed $V_M$ and the driven member speed $V_m$, and the difference between the motor position $P_M$ and the driven member position $P_m$ respectively by $K_a$, $K_b$, $K_c$, which are feedback coefficients, and adding the obtained values together. More specifically, the function F is determined by the equation (5). In other words, as in described in the operational effect (1) of the first embodiment, the full closed loop control is performed based on the detection of the driven member position $P_m$ of the driven member 400. Further, the thrust instruction τ* is compensated with the integrated feedback value g reflecting the speed $V_m$ of the driven member 400 (motion data). As a result, the second embodiment has an effect that is the same as the operational effect (1) of the first embodiment.

The illustrated embodiments may be modified in the following forms.

In the first embodiment, the feedback coefficients $K_1$ to $K_4$ are obtained in accordance with the associated equations (2-3) to (2-6). However, the coefficients $K_1$ to $K_4$ may be calculated in accordance with the following equations (5-1) to (5-6), respectively.

In the equations (5-1) to (5-4), $K_{os}$ is a parameter for suppressing overshooting, $K_d$ is a parameter for increasing vibration damping, and $K_{va}$ is a parameter for reducing vibration amplitude. The parameters $K_d$ and $K_{os}$ may be set as values from 0 to 1. Associated operators are set by the numerical setting portion 60. Further, the parameter $K_{va}$ may be set as a value from 1 to 10, and an associated operator may be set by the numerical setting portion 60.

Further, like the second embodiment, the speed loop proportional gain $K_v$ and the speed loop integral gain $K_i$ of the equations (5-1) to (5-4) are predetermined optimal values for position control, which are obtained by, for example, a test.

$$K_1 = (K_{os} + K_d) \cdot K_V \tag{5-1}$$

$$K_2 = K_{va} \cdot K_i \tag{5-2}$$

$$K_3 = (K_{os} - K_d) \cdot K_v \tag{5-3}$$

$$K_4 = -K_2 = -K_{va} \cdot K_i \tag{5-4}$$

As a result, by optimally selecting the parameters $K_{os}$, $K_d$, and $K_{va}$ by means of the numerical setting portion 60, a device can be adjusted to a relatively stable state, suppressing vibration, simply through the PI control of the speed control portion 14.

Regarding the computation of the integrated feedback value g of the first embodiment, the feedback coefficients $K_1$ to $K_4$ are assumed to be other than zero. However, the coefficients $K_2$, $K_4$ may be selected as zero. Further, the motor position $P_M$ and the driven member position $P_m$ may also be selected as zero. In other words, it is possible to exclude the coefficients $K_2$, $K_4$ and the parameters $P_M$, $P_m$ from the computation. If this is the case, the integrated feedback value g of the first embodiment is determined in accordance with the following equation (6), instead of the equation (4).

$$g = K_1 V_M + K_3 \cdot V_m \tag{6}$$

Likewise, in the second embodiment, if the motor position $P_M$ and the driven member position $P_m$ are selected as zero, the integrated feedback value g is computed in accordance with the following equation (7), instead of the equation (5).

$$g = K_a(V_M - V_m) + K_b(V_M + V_m) = (K_a + K_b)V_M + (K_b - K_a)V_m \tag{7}$$

If the coefficients of the equation (6) are compared with those of the equation (7), the following equations (8), (9) are obtained.

$$K_1 = K_a + K_b \tag{8}$$

$$K_3 = K_b - K_a \tag{9}$$

In other words, in this case, there is a relationship as indicated by the equation (8) among the speed difference coefficient $K_a$, the speed total coefficient $K_b$, and the motor speed feedback coefficient $K_1$. In the same manner, there is a relationship as indicated by the equation (9) among the speed difference coefficient $K_a$, the speed total coefficient $K_b$, and the driven member speed feedback coefficient $K_3$. The speed difference coefficient $K_a$ is for increasing the viscosity coefficient of the portion between the servomotor 300 and the driven member 400. The speed total coefficient $K_b$ is for increasing the viscosity coefficient of the portion between the servomotor 300 and the associated reference as well as that of the portion between the driven member 400 and the associated reference.

Further, in this case, the second embodiment has the effects that the vibration damping between the servomotor 300 and the driven member 400 is enhanced and the overshooting is reduced. As a result, the vibration of the machine tool is suppressed.

Also, regarding the computation of the integrated feedback value g of the first embodiment, the coefficients $K_1$, $K_3$ may be selected as zero. Further, the motor speed $V_M$ and the driven member speed $V_m$ may also be selected as zero. In other words, it is possible to exclude the coefficients $K_1$, $K_3$ and the parameters $V_M$ and $V_m$ from the computation. If this is the case, the integrated feedback value g of the first embodiment is determined in accordance with the following equation (10), instead of the equation (4).

$$g = K_2 \cdot P_M + K_4 \cdot P_m \tag{10}$$

Likewise, in the second embodiment, if the motor speed $V_M$ and the driven member speed $V_m$ are selected as zero, the integrated feedback value g is computed in accordance with the following equation (11), instead of the equation (5).

$$g = K_c(P_M - P_m) = K_c \cdot P_M + (-K_c) \cdot P_m \tag{11}$$

If the coefficients of the equation (10) are compared with those of equation (11), the following equations (12), (13) are obtained.

$$K_2 = K_c \tag{12}$$

$$K_4 = -K_c \tag{13}$$

In other words, in this case, there is a relationship as indicated by the equation (12) between the position deviation coefficient $K_c$, which is for increasing the rigidity of the portion between the servomotor 300 and the driven member 400, and the motor position feedback coefficient $K_2$. In the same manner, there is a relationship as indicated by the equation (13) between the position deviation coefficient $K_c$ and the driven member position feedback coefficient $K_4$.

Further, in this case, the second embodiment has the effect that the vibration damping between the servomotor 300 and the driven member 400 is enhanced. As a result, the vibration of the machine tool is suppressed.

Although the first embodiment employs the speed detecting device 320, a device for detecting the position of the motor, or the angle of the motor, may be provided. If this is the case, a differentiator is installed as a step preceding the element 41, and the integrator 32 is omitted.

In the illustrated embodiments, the position detecting device 340 such as a linear scale is employed. However, a device for detecting the speed of the driven member 400 may be used instead of the position detecting device 340. In this case, the differentiator 34 is omitted and an integrator is provided as a step preceding the element 44.

Although the mechanical model is a linear motion system in the illustrated embodiments, the model may be a rotation system. Further, in the embodiments, the parameters $V_M$, $P_M$, $V_m$, $P_m$ are treated as data representing a linear motion system. However, these parameters may be treated as data representing a rotation system. In other words, the present invention may be applied to a rotating drive system such as a rotating table. In this case, the control system as a whole may be treated as the rotating drive system.

The present examples and embodiments are to be considered as illustrative and not restrictive and the invention is not to be limited to the details given herein, but may be modified within the scope and equivalence of the appended claims.

The invention claimed is:

1. A device for controlling the position of a driven member of a machine tool in accordance with full closed loop control, the device comprising:

a position control portion which generates a speed instruction in correspondence with a position instruction;

a speed control portion which generates a thrust instruction in correspondence with the speed instruction in accordance with a proportional integral control;

a driving member which drives the driven member in correspondence with the thrust instruction;

a first detecting device which detects a driving state amount of the driving member;

a second detecting device which detects a driven state amount of the driven member;

a computing portion which computes an integrated feedback value in accordance with a function in which the speed and position of the driving member and the speed and position of the driven member are independent variables, wherein the speed and position of the driving member are obtained based on the detected driving state amount and the speed and position of the driven member are obtained based on the detected driven state amount; and a compensating portion which compensates the thrust instruction with the integrated feedback value, wherein the computing portion determines the integrated feedback value by multiplying each of the speed of the driving member, the position of the driving member, the speed of the driven member, and the position of the driven member by a predetermined feedback coefficient and adding the multiplied values together.

2. The device according to claim 1, wherein the feedback coefficient for multiplying the position of the driving member and the feedback coefficient for multiplying the position of the driven member have equal absolute values but different signs.

3. The device according to claim 1, further comprising a second computing portion, wherein:

if a model of the machine tool is assumed as a 2-inertia model of the driving member and the driven member, a transfer function $V_m/V_r$ between the speed instruction $V_r$ and the driven member speed $V_m$ is indicated by the following equation (1-1), and the transfer function $V_m/V_r$ with extreme values defined as $-A\pm jA$, $-B$, and $-C$ and a zero point defined as $-D$ (A, B, C, D are greater than zero) is indicated by the following equation (1-2), the second computing portion obtains a speed loop proportional gain $K_v$ and a speed loop integral gain $K_i$ for the proportional integral control, and the feedback coefficients $K_1$ to $K_4$ in accordance with the equations (1-1), (1-2), below $$\frac{V_m}{V_r} = \frac{K(K_v s + K_i)}{Mms^4 + m(K_v + K_1)s^3 + (K(M+m) + m(K_i + K_2))s^2 + K(K_v + K_1 + K_3)s + KK_i} \quad (1-1)$$

$$\frac{V_m}{V_r} = \frac{s+D}{s^4 + (2A+B+C)s^3 + (2A(B+C) + BC + 2A^2)s^2 + (2ABC + 2A^2(B+C))s + 2A^2BC} \quad (1-2)$$

where:

M is primary-side inertia in the 2-inertia model, m is secondary-side inertia in the 2-inertia model, K is rigidity in the 2-inertia model; and s is the Laplacean operator.

4. The device according to claim 1, wherein, if a parameter for suppressing movement overshoot of the driving member and that of the driven member is defined as $K_{os}$, a parameter for increasing damping of vibration between the driving member and the driven member is defined as $K_d$, and a parameter for reducing amplitude of the vibration is defined as $K_{va}$, the feedback coefficient for multiplying the speed of the driving member is set as $(K_{os}+K_d) \cdot K_v$, the feedback coefficient for multiplying the position of the driving member is set as $K_{va} \cdot K_i$, the feedback coefficient for multiplying the speed of the driven member is set as $(K_{os}-K_d) \cdot K_v$, and the feedback coefficient for multiplying the position of the driven member is set as $-K_{va} \cdot K_i$.

5. A device for controlling the position of a driven member of a machine tool in accordance with full closed loop control, the device comprising:

a position control portion which generates a speed instruction in correspondence with a position instruction:

a speed control portion which generates a thrust instruction in correspondence with the speed instruction in accordance with a proportional integral control;

a driving member which drives the driven member in correspondence with the thrust instruction;

a first detecting device which detects a driving state amount of the driving member;

a second detecting device which detects a driven state amount of the driven member;

a computing portion which computes an integrated feedback value in accordance with a function in which the speed and position of the driving member and the speed and position of the driven member are independent variables, wherein the speed and position of the driving member are obtained based on the detected driving state amount and the speed and position of the driven member are obtained based on the detected driven state amount; and a compensating portion which compensates the thrust instruction with the integrated feedback value, wherein the computing portion determines the integrated feedback value by multiplying each of the difference between the speed of the driving member and the speed of the driven member, the total of the speed of the driving member and the speed of the driven member, and the difference between the position of the driving member and the position of the driven member with a predetermined feedback coefficient and adding the multiplied values together.

6. A method for controlling the position of a driven member of a machine tool in accordance with full closed loop control, the method comprising:

generating a speed instruction in correspondence with a position instruction;

generating a thrust instruction in correspondence with the speed instruction in accordance with a proportional integral control;

driving the driven member by using a driving member in correspondence with the thrust instruction;

detecting a driving state amount of the driving member;

detecting a driven state amount of the driven member;

computing an integrated feedback value in accordance with a function in which the speed and position of the driving member and the speed and position of the driven member are independent variables, wherein the speed and position of the driving member are obtained based on the detected driving state amount and the speed and position of the driven member are obtained based on the detected driven state amount; and compensating the thrust instruction with the integrated feedback value, wherein the computing of the integrated feedback value includes multiplying each of the speed of the driving member, the position of the driving member, the speed of the driven member, and the position of the driven member by a predetermined feedback coefficient and adding the multiplied values together.

7. A method for controlling the position of a driven member of a machine tool in accordance with full closed loop control, the method comprising:

generating a speed instruction in correspondence with a position instruction;

generating a thrust instruction in correspondence with the speed instruction in accordance with a proportional integral control;

driving the driven member by using a driving member in correspondence with the thrust instruction;

detecting a driving state amount of the driving member;

detecting a driven state amount of the driven member;

computing an integrated feedback value in accordance with a function in which the speed and position of the driving member and the speed and position of the driven member are independent variables, wherein the speed and position of the driving member are obtained based on the detected driving state amount and the speed and position of the driven member are obtained based on the detected driven state amount; and compensating the thrust instruction with the integrated feedback value, wherein the computing of the integrated feedback value includes multiplying each of the difference between the speed of the driving member and the speed of the driven member, the total of the speed of the driving member and the speed of the driven member, and the difference between the position of the driving member and the position of the driven member by a predetermined feedback coefficient and adding the multiplied values together.

* * * * *